United States Patent [19]

Hertler

[11] 4,251,422
[45] Feb. 17, 1981

[54] COATING COMPOSITIONS CONTAINING POLYMERS WITH ISOCYANO GROUPS AND ALKYLBORANES

[75] Inventor: Walter R. Hertler, Kennett Square, Pa.

[73] Assignee: E. I. Du Pont de Nemours and Company, Wilmington, Del.

[21] Appl. No.: 108,843

[22] Filed: Dec. 31, 1979

[51] Int. Cl.$^3$ .................... C08F 8/30; C08K 5/10; C08G 18/82; C08G 18/83
[52] U.S. Cl. .................. 260/31.2 N; 260/31.6; 260/31.8 M; 260/31.8 S; 260/31.8 N; 260/31.8 T; 260/31.8 XA; 260/32.4; 260/32.6 N; 260/32.6 NR; 260/32.6 NA; 525/123; 525/128; 525/131; 525/337; 525/452
[58] Field of Search ............ 525/337, 128, 123, 131; 528/46, 47; 260/31.2 N, 31.6, 31.8 M, 32.4, 32.6 N, 32.6 NA

[56] References Cited

U.S. PATENT DOCUMENTS

| | | | |
|---|---|---|---|
| 3,277,033 | 10/1966 | Ugi | 260/18 |
| 3,285,992 | 11/1966 | Ugi et al. | 260/857 |
| 3,330,810 | 7/1967 | Bonin et al. | 260/75 |
| 3,454,623 | 7/1969 | Graham | 525/337 |

FOREIGN PATENT DOCUMENTS

| | | | |
|---|---|---|---|
| 4920615 | 7/1969 | Japan | 525/337 |
| 1126025 | 9/1968 | United Kingdom | 525/337 |

OTHER PUBLICATIONS

"Chemically Modified Nylons" by Goldstein et al., J. Biochem., (1974), 143, pp. 497–509, Great Britain.
"Isocyanmethyl-Polystyrol" by Skorna et al., Verlag Chemie, GmbH, D-6940 Weinheim, 1978.

Primary Examiner—William F. Hamrock

[57] ABSTRACT

This invention relates to cross-linkable film-forming compositions which contain a polymer with pendant isocyano groups and a trialkylborane cross-linking agent and to the use of the compositions in ambient temperature-cure finishes.

13 Claims, No Drawings

COATING COMPOSITIONS CONTAINING POLYMERS WITH ISOCYANO GROUPS AND ALKYLBORANES

BACKGROUND OF THE INVENTION

Polymers which contain pendant isocyano groups are known in the art. Ugi, U.S. Pat. No. 3,277,033 discloses preparation of a polyamide by reaction of a carboxylic acid, an amine, a carbonyl compound and an isonitrile. Polymeric as well as monomeric isonitriles are disclosed as being operable. A similar disclosure to the use of bifunctional and polymeric isonitriles is contained in Ugi et al., U.S. Pat. No. 3,285,992, drawn to the preparation of a polyester/amide by reaction of a carboxyl-containing polymer with an isonitrile and a carbonyl group-containing compound.

Bonin et al., U.S. Pat. No. 3,330,810, disclose the reaction of difunctional and/or polyfunctional isonitriles, including polymers which contain isocyano groups, with carboxyl-containing polymers to produce cross-linked plastics.

Skorna et al., Chem. Ber. 111, p. 806–810 and p. 3965–3968 (1978), describe the introduction of isocyano groups onto a cross-linked polystyrene resin; and Goldstein et al., Biochem J. 143, p. 497–509 (1974), describe the preparation of a nylon-type polymer which contains pendant isocyano groups.

Witte et al., Liebigs Ann. Chem., 722, p. 21–28 (1969), describe the reaction products of phenyl isocyanide with alkylboranes via an intermediate α-phenyliminoalkylborane, $C_6H_5N=CRBR_2$.

SUMMARY OF THE INVENTION

The present invention relates to a cross-linkable film-forming composition consisting essentially of:

(1) about 15 to about 80 percent by weight of said composition of a soluble polymer having a number average molecular weight of about 500 to about 50,000, said polymer containing at least about 1.5 isocyano groups per polymer chain;

(2) about 0.3 to about 50 percent by weight of said polymer of a trialkylborane cross-linking agent, with the proviso that the molar ratio of trialkylborane to isocyano groups be about 0.1 to about 1.0; and (3) about 19 to about 84 percent by weight of said composition of a solvent for the polymer.

The cross-linkable film-forming compositions of the invention are particularly useful as finishes and are curable at ambient or elevated temperatures. Low temperature curing of finishes is desirable both for reasons of economy and efficiency. The cured films are usually colorless and very hard.

DETAILED DESCRIPTION OF THE INVENTION

One of the essential ingredients in the compositions of the invention is a soluble polymer having a number average molecular weight, $M_n$, of about 500 to about 50,000 and preferably about 1500 to about 25,000. The polymer must contain an average of at least about 1.5 isocyano groups per polymer chain in order to obtain satisfactory cross-linking of the chains in the presence of a trialkylborane cross-linking agent. There is no maximum number of isocyano groups which can be present, but it is preferred that the polymer contain an average of about 3 to about 6 isocyano groups per polymer chain for optimum cross-linking efficiency. The amount of polymer present in the composition should be about 15 to about 80 percent by weight and preferably about 30 to about 60 percent by weight of the composition.

The polymer backbone structure to which isocyano groups are attached is not critical, and a large variety of soluble polymeric structures can be employed. For example, polymers which contain isocyanato groups such as those prepared by reaction of a diisocyanate with a polymeric polyol, or polymers prepared by copolymerization of 2-isocyanatoethyl methacrylate with any of a variety of well-known ethylenically unsaturated compounds may be treated with a hydroxy isocyanide, e.g., 6-hydroxyhexyl isocyanide, to obtain a polymer containing pendant isocyano groups. Alternatively, copolymerization of an isocyano-containing monomer, e.g., 2-isocyanoethyl methacrylate, with an ethylenically unsaturated compound will provide the desired isocyano group-containing polymer directly. Another method which may be employed for the preparation of a polymer with isocyano groups is direct reaction of an isocyanato isocyanide with a hydroxyl-containing polymer.

U.S. Pat. Nos. 3,277,033, 3,285,992, and 3,330,810, disclose additional types of polymers with pendant isocyano groups, and additional useful polymers and methods for their preparation will be apparent to those skilled in the art.

Another essential ingredient in the compositions of the invention is a trialkylborane cross-linking agent which serves to cross-link polymer chains by reaction with pendant isocyano groups. Although applicant does not wish to be bound by the proposed mechanism of cross-linking, it is believed that the trialkylborane functions as shown in equation (1).

Equation (1)

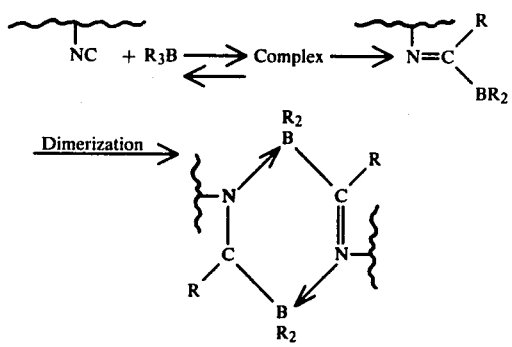

Suitable trialkylboranes include those of the structure $R_3B$ wherein the R groups, independently, may be alkyl or cycloalkyl of 2-12 carbon atoms, and the R groups may be joined to form heterocyclic rings containing the boron atom. Suitable trialkylboranes include:
Triethylborane
Tri-n-propylborane
Diethyl-n-butylborane
Pentamethylene-n-butylborane
Tri-n-butylborane
Triisobutylborane
Tri-sec-butylborane
Diisobutyl-t-butylborane
Triisopropylborane Tri-t-butylborane
Tris(isopentyl)borane
Tri-n-pentylborane
Tri-n-hexylborane
Dodecahydro-9-b-boraphenalene
Tricyclohexylborane
Tri-n-decylborane
Tri-n-dodecylborane Triethylborane is a preferred cross-linking agent.

The amount of trialkylborane cross-linking agent employed will be determined by the molecular weight of the soluble polymer and the concentration of isocyano groups per polymer chain. To achieve effective cross-linking the trialkylborane should be present at about 0.3 to about 50 percent by weight of the polymer with the proviso that the molar ratio of trialkylborane to isocyano groups is about 0.1 to about 1.0, preferably about 0.2 to about 0.5 mole per mole of isocyano group.

Another essential ingredient in the compositions of the invention is a solvent for the isocyano-containing polymer. The solvent may be a single solvent, or a mixture of solvents. Suitable solvents include any of a variety of organic liquids including esters, ethers, aromatic and aliphatic hydrocarbons including halogenated hydrocarbons, ketones, amides, and alcohols.

Examples of suitable solvents include toluene, the xylenes, chlorobenzene, o-dichlorobenzene, 1,1,1-trichloroethane, methylene chloride, chloroform, 1,1,2-trichloroethane, 1,1,2-trichloroethylene, methylcyclohexane, ethyl acetate, n-butyl acetate, tetrahydrofuran, 1,2-dimethoxyethane, 2-ethoxyethyl acetate, dioxane, acetone, 2-butanone, 3-pentanone, N,N-dimethylformamide 2-butoxyethanol, 2-ethoxyethanol, N,N-dimethylacetamide, and N-methylpyrrolidone; and mixtures of these solvents in various proportions as may be required to attain solution.

The quantity of solvent required for the composition is that necessary to achieve solution of the polymer and to produce the desired solution viscosity for the coating method to be employed. Generally the solvent comprises about 19 to about 84 percent by weight and preferably about 39 to about 69 percent of the cross-linkable composition.

In addition to the essential components of the film-forming composition, it is sometimes desirable to include certain optional components which provide for improved properties and/or processing of the compositions. For example, when a very low level of trialkylborane cross-linking agent is used, addition of a nonpolymeric diisocyanide results in a faster and more effective cure of the composition. The particular diisocyanide employed is not critical and any of a variety of known diisocyanides may be used, for example those diisocyanides disclosed in U.S. Pat. No. 3,330,810, Column 4, lines 34–52. Dodecamethylene diisocyanide is specifically exemplified in Example 1. It is preferred to use about 12 to about 17 percent by weight of the diisocyanide based on the soluble polymer, component (1).

Organic plasticizers can also be used in the film-forming compositions of this invention in amounts of about 1 to about 20 percent by weight based on the weight of components (1) and (2). Monomeric and polymeric plasticizers can be used such as phthalate ester plasticizers, and in particular, alkyl and cycloalkyl ester phthalates in which the alkyl groups have 2–10 carbon atoms such as dioctyl phthalate, didecyl phthalate, butyl benzyl phthalates, dicyclohexyl phthalate and mixtures thereof. Epoxidized soya bean oil, oil free and oil modified alkyds can also be used as plasticizers. Polyester resins such as alkylene glycol esters of adipic and benzoic acid, for example, ethylene glycol adipate benzoate, neopentyl glycol adipate benzoate, ethylene glycol adipate benzoate phthalate, can also be used.

The film-forming compositions used in this invention can be pigmented. Typical pigments which can be used are metallic oxides, preferably titanium dioxide, zinc oxide, iron oxide, and the like, metallic flakes, such as aluminum flake, metallic powders, metallic hydroxides, "Afflair" pigments, i.e., mica coated with titanium dioxide, sulfates, carbonates, carbon blacks, silica, talc, china clay and other pigments, organic dyes and lakes.

The film-forming compositions may also contain a pigment dispersant, i.e., a polymer compatible with the pigment and with the soluble polymer, component (1), which aids in incorporating the pigment into the composition.

Other compatible resins, such as vinyl chloride copolymers, polyurethanes, cellulose acetate butyrate, and silicone resins, can be incorporated into the film-forming compositions of this invention. Also, ultraviolet light stabilizers and antioxidants can be incorporated into the compositions.

The novel film-forming compositions can be applied to a variety of substrates such as glass, plastics, metals such as aluminum, steel and the like, by the usual methods such as brushing, dipping, roller coating, flow coating, coil coating, spraying, drawing down, and the like.

Films of the invention can be cross-linked at temperatures of about 25° to about 150°. Although low-temperature curing of films is desirable because of reduced energy requirements, harder finishes are obtained when elevated temperatures are employed, preferably temperatures of about 105° to about 120° C.

The films of this invention are useful as automotive enamel topcoats and primers. They are advantageous in that they may be cured at ambient temperature and also in that superior hardness may be obtained at modest bake temperatures. Other uses include appliance topcoats and automotive refinish applications.

The following are illustrative examples of the invention in which all parts and percentages are by weight and all degrees are Celsius unless otherwise stated.

Hardness was measured by a Tukon Microhardness tester, Model FB, Wilson Mechanical Instruments Division, American Cable Company, with a 25-gram load. The units of hardness (Knoop Hardness Number, KHN) relate to the length of indentation of a pyramidal-shaped diamond tip on the test surface under an applied load.

Coatings were prepared by a drawdown with a 10-mil (254 μm) doctor knife unless otherwise specified.

Acetone-solubility of the coatings was determined by rubbing the coating with an applicator soaked in acetone, and examining the coating for indication of diisolution.

Color values, Δb, were determined using ANSI/ASTM procedure D2244-78. The colorimeter employed was Du-color, Model 220, manufactured by Neotec Instruments, Inc.

Gloss was measured optically with a 60° incident and a 60°- viewing angle from the vertical.

The 6-hydroxyhexyl isocyanide used in the preparation of isocyano copolymers in the following examples was synthesized as follows: To 214.4 g (2 moles) of 6-aminohexyl alcohol, which was stirred and heated to keep the material molten, was added dropwise 120.1 g (2 moles) of methyl formate. When the addition was completed, the mixture was stirred and heated at reflux for two hours. After removal of the methanol formed in vacuo, the residue was recrystallized from tetrahydrofuran to give 237.4 g of 6-hydroxyhexylformamide, m.p. 43.5°–45°.

Anal. Calcd for $C_7H_{15}NO_2$: C, 57.90; H, 10.41; N, 9.65. Found: C, 57.19; H, 9.95; N, 9.29. C, 57.17; H, 10.21; N, 9.29.

To a stirred solution of 145.2 g of 6-hydroxylhexylformamide in 500 ml of anhydrous triethylamine and 835 ml of anhydrous methylene chloride was added dropwise 108.7 g (1 mole) of chlorotrimethylsilane. After stirring at reflux for 30 minutes, 100 g of phosgene was added from a cold trap while the stirred reaction mixture was permitted to reflux under a Dry Ice-cooled condenser. Then cold water was added, and the organic layer was washed with aqueous sodium bicarbonate, dried, and evaporated to leave 203 g of dark liquid 6-trimethylsiloxyhexyl isocyanide which was not purified, but used directly in the next step.

A mixture of 101 g of 6-trimethylsiloxyhexyl isocyanide and 1 liter of methanol was stirred for one hour at reflux. Because infrared spectroscopy indicated that no charge had occurred, 0.5 g of acidic ion-exchange resin catalyst was added, and the reaction mixture was heated at reflux for two hours. The mixture was filtered and the filtrate was concentrated in vacuo. The liquid residue was dissolved in ether and passed through neutral alumina to give, after evaporation of the ether, 52.5 g of 6-hydroxyhexyl isocyanide as a liquid.

Anal. Calcd for $C_7H_{13}NO$: C, 66.10; H, 10.30; N, 11.02. Found: C, 65.05; H, 10.35; N, 10.24. C, 65.35; H, 10.43; N, 10.55.

Dodecamethylene diisocyanide was prepared by reaction of dodecamethylene bis(formamide) with phosgene and triethylamine in dichloromethane solvent, and it was purified by distillation, b.p. 94°/0.15 mm.

EXAMPLE 1

Coating Composition: Copoly(styrene, butyl acrylate, 3-aza-4-keto-5-oxa-11-isocyanoundecyl methacrylate)/Dodecahydro-9-b-boraphenalene A. Polymer Preparation A mixture of 80 g of a 54.6% solids solution of copoly(styrene, butyl acrylate, 2-isocyanatoethyl methacrylate, in the ratio 32.96:10.2:45.99) $\overline{M}n \sim 1500$, $\overline{M}w \sim 5000$, in a 30:70 mixture of 2-ethoxyethyl acetate/ethyl acetate, 16.4 g of 6-hydroxyhexyl isocyanide and 1 ml of a 1% solution of dibutyltin dilaurate in toluene was stirred at reflux for one hour. Infrared spectroscopy indicated that the resulting copoly(styrene, butyl acrylate, 3-aza-4-keto-5-oxa-11-isocyanoundecyl methacrylate) product was nearly free of isocyanate. The solids content of the product solution was 62.43%.

B. Coating Preparation and Curing

A solution of 235 mg (1.33 mmol) of dodecahydro-9-b-boraphenalene in 0.5 ml of tetrahydrofuran was added to a mixture of 1 g of the polymer solution of part A and 0.1 g of dodecamethylene diisocyanide. The resulting solution was coated on a glass panel and on an infrared salt plate. Infrared spectroscopy showed peaks of equal intensity at 2150 cm$^{-1}$ (isocyanide) and 2250 cm$^{-1}$ (isocyanideborane complex), and the intensity ratio of the peaks was unchanged after 1 hour. The coating solution was gelled after 18 hours, but the coating remained soluble in acetone. After 18 hours, the coated panel was baked for 30 minutes at 121°. The cured composition was yellow, wrinkled, and completely unaffected by rubbing with acetone. After 12 days, the Tukon hardness was 0.73 KHN.

EXAMPLE 2

Coating Composition: Copoly(styrene, butyl acrylate, 3-aza-4-keto-5-oxa-11-isocyanoundecyl methacrylate)/Dodecahydro-9-b-boraphenalene A mixture of 2 g of the polymer solution of Part A of Example 1, and 0.520 g (70% molar excess) of dodecahydro-9-b-boraphenalene in 0.5 ml of tetrahydrofuran was coated on glass panels and infrared salt plates. Infrared spectroscopy showed absorption for the isocyanide-borane complex (2250 cm$^{-1}$) and only a trace of uncomplexed isocyanide. The coated panels were baked for 30 minutes at 80°, 93°, 107°, and 121°, to give pale-yellow, clear, glossy coatings. Physical properties of the cured compositions are summarized in Table I.

TABLE I

| Bake Temperature, ° | Tukon Hardness (KHN) | Acetone Solubility |
|---|---|---|
| 80 | 6.20 | Slowly soluble |
| 93 | 6.23 | Insoluble |
| 107 | 12.75 | Insoluble |
| 121 | 13.50 | Insoluble |

A coated panel was baked for 30 minutes at 121°, and it was subsequently exposed for a total of 317 hours to ultraviolet light in a Q-U-V Accelerated Weathering Tester (manufactured by Q-Panel Co., Cleveland, Ohio), and the results are summarized in Table II.

TABLE II

| Exposure Time (hrs) | Tukon Hardness (KHN) | 60° Gloss | Yellowing (Colorimeter Δb) |
|---|---|---|---|
| 0 | 15.30 | 100.2 | +8.84 |
| 42 | 1.76 | 100.2 | +7.81 |
| 135 | 4.79 | 100.1 | +8.82 |
| 205 | 6.34 | 100.1 | +11.44 |
| 317 | 23.32 | 100.1 | +18.69 |

A coated panel was baked at 107° for 30 minutes and then stored for 2 days at 60° in a Cleveland Condensing Humidity Cabinet (manufactured by Q-Panel Co.). The coating showed extensive whitening.

EXAMPLE 3

Coating Composition: Copoly(styrene, butyl acrylate, 3-aza-4-keto-5-oxa-11-isocyanoundecyl methacrylate)/Triethylborane To 1 g of the polymer solution of Part A of Example 1, was added 1.33 ml (1.0 equivalent) of 1 M triethylborane in tetrahydrofuran under a nitrogen atmosphere. The solution was coated on glass panels. The coating solution gelled within 10 minutes. After 2 days at 25°, the clear, colorless, cured composition had a Tukon hardness of 2.45 KHN, and it was insoluble in acetone.

EXAMPLE 4

Example 3 was repeated except that 0.135 g of triethylamine in addition to the triethylborane was added to the polymer solution. The resulting composition was coated on two glass panels. The coating solution was observed to gel within 30 minutes. One of the coated panels was cured at 25° for 2 days. The composition was insoluble in acetone; Tukon hardness, 2.47 KHN.

The second coated panel was cured at 121° for 30 minutes, and the cured composition was insoluble in acetone; Tukon hardness, 14.5 KHN.

EXAMPLE 5

Coating Composition: Copoly(styrene, butyl acrylate, 3-aza-4-keto-5-oxa-11-isocyanoundecyl methacrylate)/Tri-n-butylborane To 2 g of the polymer solution of Part A of Example 1 was added 2.68 ml of 1 M tri-n-butylborane in tetrahydrofuran. The solution was coated on glass and steel panels using a 15-mil (382 μm) doctor knife. The coating solution gelled in less than 1 minute. A panel stored at room temperature for 18 hrs was insoluble in acetone and had a Tukon hardness of 1.47 KHN. Panels which were baked for 30 minutes were insoluble in acetone. Results are summarized in Table III.

TABLE III

| Bake Temperature, ° | Tukon Hardness, KHN |
| --- | --- |
| 25 | 1.47 |
| 77 | 1.19 |
| 93 | 1.52 |
| 107 | 2.92 |

EXAMPLE 6

Coating Composition: Copoly(styrene, butyl acrylate, 3-aza-4-keto-5-oxa-11-isocyanoundecyl methacrylate)/Triethylborane To 1 g of the polymer solution of Part A of Example 1 was added 0.75 ml (0.56 equivalent) of 1 M triethylborane in tetrahydrofuran, and the solution was coated on two steel panels. The coated panels were baked for 30 minutes at 107° and 121°, respectively. The clear, cured compositions had Tukon hardnesses of 7 KHN and 12.5 KHN, respectively. The cured panels were stored at 60° for 38 hours in a Cleveland Condensing Humidity Cabinet. Both compositions developed temporary blisters which disappeared after standing for several days. Whitening of the compositions was not observed.

EXAMPLE 7

Coating Composition: Isonitrile-modified Resin/Triethylborane

A. Resin Preparation

A mixture of 2.54 g (0.02 mole) of 6-hydroxyhexyl isocyanide, 37 ml of tetrahydrofuran, 4.45 g of isophorone diisocyanate, and 1 ml of a 1% solution of stannous octoate in toluene was stirred at reflux for 24 hours. The 6-hydroxyhexyl isocyanide was further purified before use by distillation through a Vigreux Column, b.p. 82°/0.4 mm.

Anal. Calcd for $C_7H_{13}NO$: C, 66.10; H, 10.30; N, 11.02. Found: C, 66.06; H, 10.31; N, 11.15.

Infrared spectroscopy showed loss of part of the isocyanate absorption, and loss of all hydroxyl absorption with formation of a new N-H peak, consistent with formation of 3-isocyanato-1,5,5-trimethyl-1-(2-aza-3-keto-4-oxa-10-isocyanodecyl)cyclohexane. To this solution was added 23.8 g of a polymer solution (55% solids) of hydroxyl-containing resin, $\overline{M}n=1500$; $\overline{M}w=20,000$, of the type described in Example 1 of U.S. Pat. No. 3,558,564. The resulting solution was stirred at reflux for 2.5 days without complete consumption of isocyanate (infrared); then 5 g of 2-ethoxyethyl acetate was added, and tetrahydrofuran was removed by distillation. The remaining solution was stirred at 96° for 2.5 hours. Infrared spectroscopy showed a small amount of residual isocyanate in the solution of isonitrile-modified resin; 49.4% solids; $\overline{M}n \sim 1100$; $\overline{M}w \sim 40,000$ (2 peaks).

B. Coating Preparation and Curing

To 6 g of the resin solution of Part A was added 3 ml of 1 M triethylborane in tetrahydrofuran, and the solution was coated on steel and glass panels. The coating solution was gelled in 2 minutes. The coated panels were cured and the results are summarized in Table IV.

TABLE IV

| Bake Temp., ° | Time, hrs. | Tukon Hardness (KHN) |
| --- | --- | --- |
| 25 | 5 | —(1) |
|  | 20 | 1.65 |
|  | 48 | 3.06 |
|  | 96 | 3.77 |
| 121 | 0.5 | 28.9(2) |
| 149 | 0.5 | 29.7(3) |

(1)Coated composition was insoluble in acetone
(2)Cured composition was clear and colorless
(3)Cured composition was slightly yellow The panels cured at 121° and 149° were whitened after storage at 60° for 24 hours in a Cleveland Condensing Humidity Cabinet.

EXAMPLE 8

Coating Composition: Isonitrile-modified Resin/Triethylborane

To 3 g of the resin solution of Part A of Example 7 was added 0.35 ml (0.24 equivalent) of 1 M triethylborane in tetrahydrofuran, and the solution was coated on primed aluminum panels. The coating solution gelled in one minute. A coating which was allowed to stand at room temperature developed a Tukon hardness of 1.10 KHN during 6 days. A coating which was cured at 121° for 30 minutes had a Tukon hardness of 18.0 KHN. Both cured compositions were unaffected by storage for 24 hours in a 60° Cleveland Condensing Humidity Cabinet.

In a 196-hour exposure of the 121°-baked composition to ultraviolet light in a Q-U-V Accelerated Weathering Tester, the Tukon hardness increased from 18.0 KHN to 32.59 KHN. The initial 60° gloss of 83.2 remained nearly unchanged at 83.1. The colorimeter Δb value rose from +1.84 to +4.22 indicating yellowing.

In the following claims, the term "consisting essentially of" is used to mean "excluding other elements of any essential significance to the claimed combination." It is thus intended that the claims may be infringed even though additional components, not mentioned in the claims and which do not affect the basic characteristics of the coating composition, are present in that composition.

What is claimed is:

1. A cross-linkable film-forming composition consisting essentially of:
   (1) about 15 to about 80 percent by weight of said composition of a soluble polymer having a number average molecular weight of about 500 to about 50,000, said polymer containing at least about 1.5 isocyano groups per polymer chain;
   (2) about 0.3 to about 50 percent by weight of said polymer of a trialkylborane cross-linking agent, the molar ratio of trialkylborane to isocyano groups being about 0.1 to about 1.0; and (3) about 19 to about 84 percent by weight of said composition of an organic solvent for the polymer.

2. A composition of claim 1 wherein the soluble polymer has a number average molecular weight of about 1,500 to about 25,000.

3. A composition of claim 1 wherein the soluble polymer contains at least about 3 to 6 isocyano groups per polymer chain.

4. A composition of claim 1 wherein the soluble polymer constitutes about 30 to about 60 percent by weight of the composition.

5. A composition of claim 1 wherein the polymer is a copolymer of styrene and butyl acrylate with an isocyano-substituted methacrylate.

6. A composition of claim 1 wherein the trialkylborane cross-linking agent is triethylborane.

7. A composition of claim 1 wherein the molar ratio of trialkylborane to isocyano groups is about 0.2 to about 0.5.

8. A composition of claim 1 wherein the solvent constitutes about 39 to about 69 percent by weight of the composition.

9. A composition of claim 1 containing about 12 to about 17 percent by weight of the polymer of a non-polymeric diisocyanide.

10. A cross-linkable film-forming composition consisting essentially of:
(1) about 30 to about 60 percent by weight of said composition of a soluble polymer having a number average molecular weight of about 1500 to about 25,000, said polymer containing at least about 3 to 6 isocyano groups per polymer chain;
(2) about 0.3 to about 50 percent by weight of said polymer of a trialkylborane cross-linking agent, the molar ratio of trialkylborane to isocyano groups being about 0.2 to about 0.5; and
(3) about 39 to about 69 percent by weight of said composition of an organic solvent for the polymer.

11. A composition of claim 10 wherein the polymer is a copolymer of styrene and butyl acrylate with an isocyano-substituted methacrylate.

12. A composition of claim 10 wherein the trialkylborane is triethylborane.

13. A composition of claim 10 containing about 12 to about 17 percent by weight of the polymer of a non-polymeric diisocyanide.

* * * * *